United States Patent
Maloney

(10) Patent No.: US 10,428,847 B2
(45) Date of Patent: Oct. 1, 2019

(54) TAPERED HEAD CLINCH FASTENER

(71) Applicant: Penn Engineering & Manufacturing Corp., Danboro, PA (US)

(72) Inventor: Michael J. Maloney, Doylestown, PA (US)

(73) Assignee: PEM Management, Inc., Wilmington, DE (US)

( * ) Notice: Subject to any disclaimer, the term of this patent is extended or adjusted under 35 U.S.C. 154(b) by 0 days.

(21) Appl. No.: 15/221,861

(22) Filed: Jul. 28, 2016

(65) Prior Publication Data

US 2017/0159684 A1 Jun. 8, 2017

Related U.S. Application Data

(60) Provisional application No. 62/197,850, filed on Jul. 28, 2015.

(51) Int. Cl.
 *F16B 19/08* (2006.01)
 *F16B 5/04* (2006.01)
 *F16B 19/10* (2006.01)
 *F16B 19/06* (2006.01)

(52) U.S. Cl.
 CPC .............. *F16B 5/04* (2013.01); *F16B 19/10* (2013.01); *F16B 19/06* (2013.01)

(58) Field of Classification Search
 USPC .......................................................... 411/501
 See application file for complete search history.

(56) References Cited

U.S. PATENT DOCUMENTS

| | | | | |
|---|---|---|---|---|
| 3,516,699 A | * | 6/1970 | Bergere | ............... F16B 19/04 29/525 |
| 3,526,032 A | * | 9/1970 | Pipher | ..................... B21J 15/02 29/509 |
| 3,909,913 A | * | 10/1975 | Tildesley | ............... B21J 15/025 29/432 |
| 3,967,669 A | | 7/1976 | Egner | |
| 4,004,483 A | | 1/1977 | Hallock | |
| 4,221,041 A | * | 9/1980 | Hufnagl | ................... B21J 15/02 29/512 |

(Continued)

FOREIGN PATENT DOCUMENTS

| | | |
|---|---|---|
| CN | 101184925 | 5/2008 |
| EP | 2671654 | 12/2013 |
| JP | 2006226302 | 8/2006 |

OTHER PUBLICATIONS

PCT International search report and the written opinion of the international searching authority, PCT/US2016/044582, dated Jan. 17, 2017.

*Primary Examiner* — Gary W Estremsky
(74) *Attorney, Agent, or Firm* — Gregory J. Gore, Esq.

(57) ABSTRACT

A fastener with a tapered head that frictionally mates with a tapered hole in a punched sheet. Frictional attachment is achieved with the fastener head remaining flush with the top of the panel. If a second panel of softer material is placed underneath against the backside of the first panel, in the same pressing step clinch features on the shank of the fastener attach to the second panel and attach the two sheets face-to-face. Attachment of the tapered head with the top panel exploits two different attachment phenomena: a locking taper and, depending on the choice of materials such as stainless steel, attachment by galling.

11 Claims, 4 Drawing Sheets

(56) References Cited

U.S. PATENT DOCUMENTS

| | | | | |
|---|---|---|---|---|
| 4,757,596 A | * | 7/1988 | Herb | B21J 15/32 |
| | | | | 227/119 |
| 5,333,980 A | * | 8/1994 | Pratt | F16B 19/1027 |
| | | | | 411/34 |
| 5,513,933 A | | 5/1996 | Rom | |
| 5,671,521 A | * | 9/1997 | Briles | B21J 15/02 |
| | | | | 29/407.05 |
| 5,788,039 A | * | 8/1998 | Carpi | F16D 13/58 |
| | | | | 192/112 |
| 6,244,808 B1 | * | 6/2001 | Donhauser | B21J 15/10 |
| | | | | 411/179 |
| 8,297,899 B2 | * | 10/2012 | Maloney | B21K 1/58 |
| | | | | 411/339 |
| 8,851,814 B2 | * | 10/2014 | Lee | F16B 19/086 |
| | | | | 411/501 |
| 2004/0182209 A1 | | 9/2004 | Franco et al. | |
| 2005/0281635 A1 | | 12/2005 | Wilson | |
| 2006/0039777 A1 | * | 2/2006 | Palm | F16B 5/04 |
| | | | | 411/455 |
| 2007/0253658 A1 | | 11/2007 | Maloney | |
| 2012/0324978 A1 | * | 12/2012 | Maloney | B21K 1/60 |
| | | | | 72/360 |

* cited by examiner

FIG. 4A
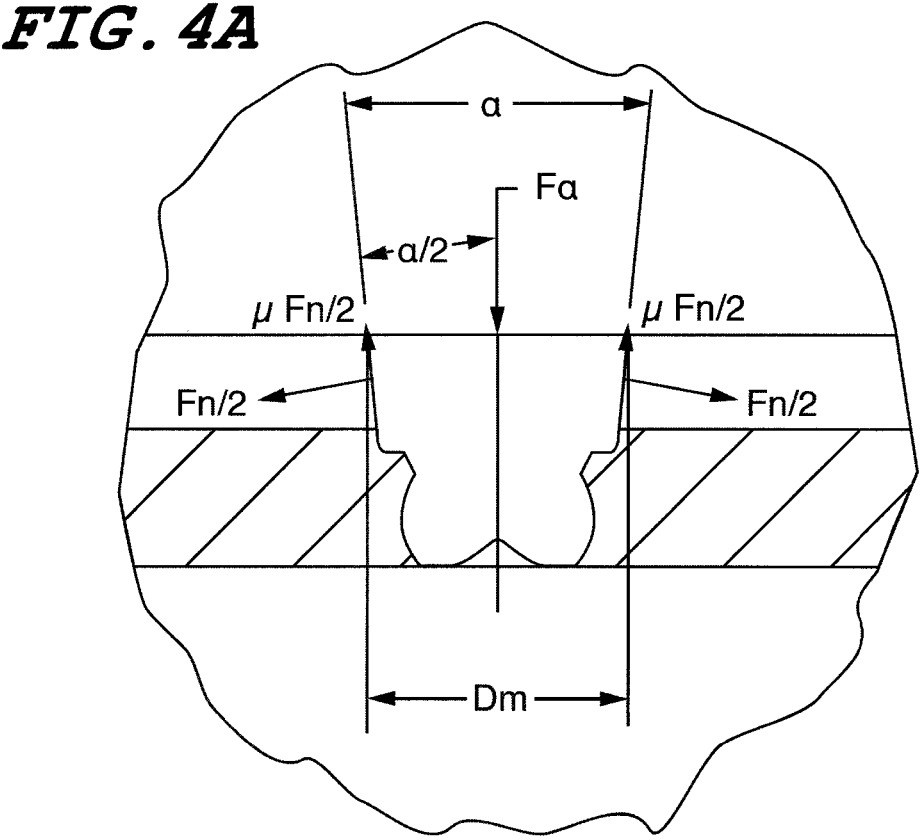
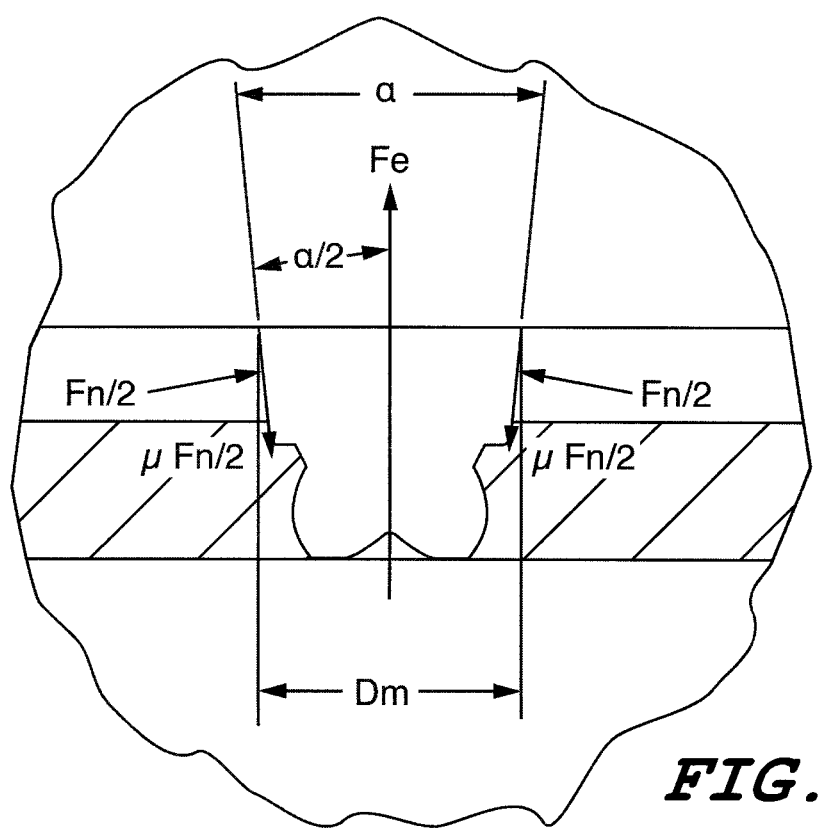
FIG. 4B

TAPERED HEAD CLINCH FASTENER

RELATED APPLICATIONS

This application is a non-provisional patent application of U.S. provisional patent application No. 62/197,850 entitled Tapered Head Tack Pin, filed Jul. 28, 2016, priority from which is hereby claimed.

FIELD OF THE INVENTION

The present invention relates to fasteners for connecting metal panels in face-to-face configuration.

BACKGROUND OF THE INVENTION

To attach first and second panels with a fastener that extends through a hole in the first panel, the fastener usually must have a head that either abuts or otherwise attaches to the first panel. In some configurations, the head of the fastener lies flush or sub-flush with the first panel. In such configurations, the first panel is usually soft enough for the fastener head to embed into the panel to achieve the flush result. This option is not possible, however, if the first panel is composed of a very hard material. Therefore, it would be desirable to provide a fastener that joins top and bottom panels and is flush mounted to the top panel. It would also be desirable to provide a flush-mount fastener that can be flush mounted to a panel composed of a very hard material.

Galling is a form of wear between sliding surfaces where attachment is the result of friction and adhesion. In the presence of a high force compressing the surfaces together, galling occurs as material from both surfaces is pulled with the contacting surface. Galling is caused by a combination of friction and adhesion between the surfaces, followed by a tearing of the crystalline structure of the materials involved. Therefore, it would also be desirable to provide an assembly of mating metallic panels wherein the panel material composition and attachment process are specifically selected to utilize galling as the primary or secondary attachment mechanism.

SUMMARY OF THE INVENTION

During sheet metal punching, the sheet is supported on a die, which has a hole that is slightly larger than the punch to provide clearance for the punch and slug to pass through. When the hole is punched, a portion of the hole tears out to the larger diameter of the supporting die on the opposite side of the sheet. This condition is shown in FIG. 2 and makes assembly with the fastener easy to make. The result is a hole with a portion that is divergent (expands radially) in the direction of the die.

In a preferred embodiment, the invention provides a clinch fastener that is constructed and arranged to attach top and bottom panels and lies flush with the top panel once installed. In another preferred embodiment, the present invention comprises a clinch fastener for flush attachment of a first panel made from a hard material to a second panel made from a relatively soft material such as aluminum. The fastener has a tapered head that frictionally mates with the above-described tapered hole in a punched sheet. By turning the punched sheet die-side-up, and then installing the fastener into the die side of the tapered hole, a frictional attachment can be achieved with the fastener head remaining flush with the top of the panel. If, in the same pressing step, a second panel of softer material is placed underneath and against the backside of the first panel, clinch features on the shank of the fastener attach to the second panel and provide face-to-face attachment of the two sheets. Attachment of the tapered head with the top panel exploits two different attachment phenomena: a locking taper and, depending on the choice of materials, galling.

In one preferred embodiment, the invention comprises a clinch fastener having from top to bottom: a frustoconical head having a bottom surface substantially perpendicular to a central vertical axis of the fastener; an undercut located immediately below the head; and a shank at the bottom of the fastener located immediately below the undercut. The fastener head preferably has a planar top surface substantially parallel to the bottom surface and the fastener's lateral cross section is circular and symmetrical about the vertical axis. The fastener shank can be barrel-shaped with a distal bottom end that is tapered.

In another preferred embodiment, the invention comprises an assembly of a first top panel and a second bottom panel. The first top panel has a first compound circular hole with two concentric sections, namely, a tapered upper section downwardly convergent to a junction with a contiguous lower section of uniform diameter. A second bottom panel is positioned face-to-face with the first panel and has a second circular hole aligned with the lower section of the first hole. A clinch fastener with a frustoconical head joins the first and second panels. The fastener head preferably lies flush with a top surface of the first panel and is adhered to the first top panel by galling. The fastener further includes an undercut which receives the cold flow of metal from the bottom panel. In one embodiment, the fastener and the top panel can be composed of stainless steel.

In a further embodiment, the invention comprises an assembly of mating metallic panels wherein the panel material composition and attachment process are specifically selected to utilize galling as the primary or secondary attachment mechanism. In this embodiment, the assembly may utilize the inventive connector described above to join metal panels face-to-face to utilize the attachment phenomena of a locking taper and/or galling.

These and other objects and advantages will be apparent from the following drawings and description of the preferred embodiments. Before explaining numerous embodiments of the invention in detail, it is to be understood that the invention is not limited in its application or to the details of construction in the following description or illustrated in the drawings. The invention is capable of other embodiments and of being carried out in various ways.

BRIEF DESCRIPTION OF THE DRAWINGS

FIGS. 4A and 4B are enlarged front elevation diagrams illustrating the locking taper forces of the fastener of FIG. 1 during installation; and, FIGS. 5A-5D are a series of enlarged sectional views showing a method of fastening two metal panels and a panel assembly in accordance with further embodiments of the invention.

DESCRIPTION OF THE PREFERRED EMBODIMENT

Figure 1:
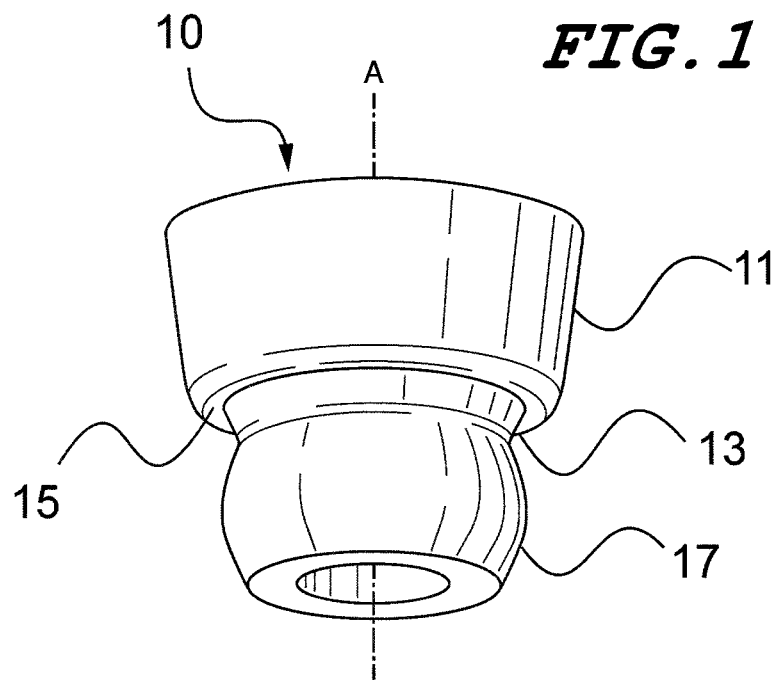
FIG. 1 is a bottom, front perspective view of a fastener in accordance with a preferred embodiment of the invention.

A fastener in accordance with a preferred embodiment of the invention is shown in FIG. 1 and designated generally by reference numeral 10. In this embodiment, the fastener 10 comprises a clinch fastener having a tapered frusto-conical head 11 with a bottom surface 15, an undercut 13, and a barrel-shaped shank 17. The bottom surface 15 functions as a displacer of material in the receiving (lower) panel 34. The undercut 13 extends from the bottom surface 15 and receives the displaced material of the lower panel 34. The barrel-shaped shank 17 has a tapered, distal end for guiding the fastener into the receiving hole in a metal panel. The bottom displacer surface 15 is oriented substantially perpendicular to a central vertical axis "A".

Figure 2:
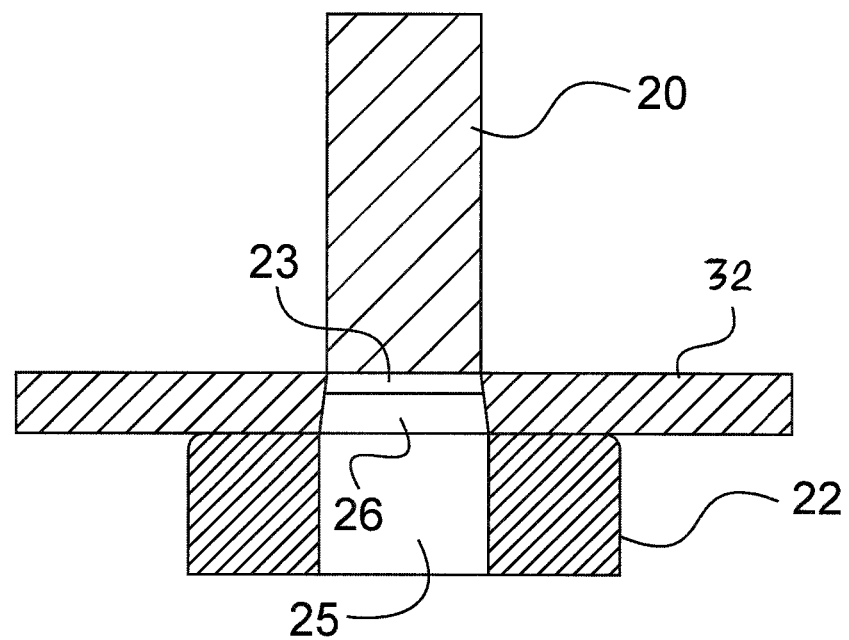
FIG. 2 is a sectional view of a punch, die and metal panel, and shows the shape of a punched hole in the metal panel of an assembly in accordance with another embodiment of the invention.

FIG. 2 shows a punch 20 and die 22 for making a receiving hole in a metal panel 24 in which the fastener 10 is inserted. The punch 20 is typically ground to size and the die must have a clearance aperture 25 for the punch 20 and slug to pass through. The profile of the hole in the panel 24 after punching has an upper straight wall portion 23, and a lower, tapered tear-out portion 26 having a larger diameter 26 than the upper portion. The "upper" and "lower" portions are described with reference to the orientation of the panel shown in FIG. 2; however, FIGS. 3 and 5, the panel is shown inverted (compared to FIG. 2) and the straight wall portion is located in the lower portion of the hole and the tapered portion is located in the upper portion of the hole.

Figure 3:
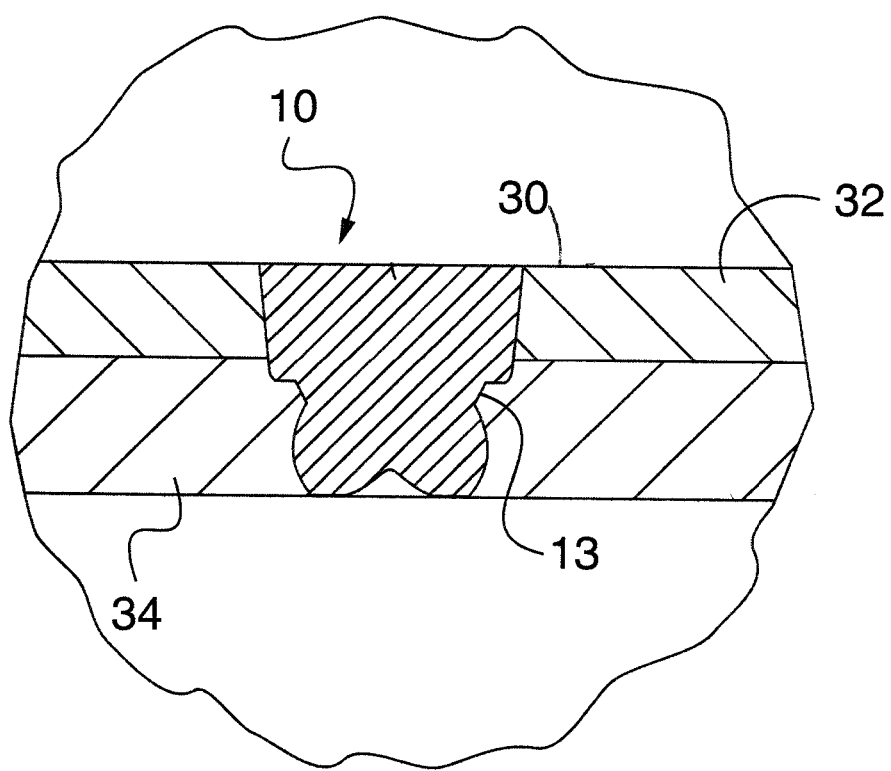
FIG. 3 is an enlarged sectional view of the fastener of FIG. 1 connecting two metal panels.

FIG. 3 shows an enlarged section of two panels 32, 34 that are connected using the fastener 10 described above and installed in accordance with an assembly method of the invention. In this embodiment, the head 11 of the fastener 10 has a shape that generally complements the shape of the hole in the upper panel 32. The head 11 of the fastener 10 is dimensioned to be installed flush with the top surface 30 of the top panel 32. The tapered head 11 maintains the mechanical ability to captivate the upper panel 32 to the fastener 10 in the upward direction. In the assembly shown in FIG. 3, the bottom panel 34 is composed of softer material than the fastener 10, which permits the use of a clinch undercut 13. The displacer surface 15 pushes metal from the bottom panel 34 into the undercut 13 located just above the shank, which holds the fastener 10 to the bottom panel 34. In a preferred embodiment, the top panel 32 has nearly the same hardness as the fastener 10.

The locking taper feature of the fastener 10 is illustrated in FIGS. 4A and 4B, which show both the installation and static condition of the fastener 10 as described in FIGS. 1 and 3. FIGS. 4A and 4B illustrate and describe the forces and scheme necessary to determine the minimal tapering required for self-locking. The orthogonal force of the uniformly distributed taper "Fn" is modeled at the midline of the conical section at "Dm". Quite simply, the locking taper will retain the tapered portion of the fastener in the top panel when the vertical component of the friction force exceeds the vertical component of the normal force and the installation force is removed or is zero. The friction force acts in the direction opposite the direction the fastener is being pushed. When the installation force is removed, the vertical component of the normal force acts to push the fastener out of the top panel. The friction force holds the fastener in place in the opposite direction.

Referring to the static diagrams of FIGS. 4A and 4B, the theoretical force needed to extract the tapered connector "Fe" may be calculated as follows:

Summation of the forces in the "Y" direction:

$$\sum Fy = 0 = Fe - \left(2 * \frac{1}{2} * \mu * Fn * \cos\left(\frac{\alpha}{2}\right)\right) + \left(2 * \frac{1}{2} * Fn * \sin\left(\frac{\alpha}{2}\right)\right)$$

$$Fe = Fn\left(\mu * \cos\left(\frac{\alpha}{2}\right) - \sin\left(\frac{\alpha}{2}\right)\right)$$

Understanding that the coefficient of friction "$\mu$"=$\tan(\varphi)$ where $\varphi$ is an implicit sliding angle $$\varphi = \arctan(\mu)$$

$$Fe = Fn * \left(\frac{\sin(\varphi)}{\cos(\varphi)} * \cos\left(\frac{\alpha}{2}\right) - \sin\left(\frac{\alpha}{2}\right)\right)$$

$$Fe = \frac{Fn}{\cos(\varphi)} \left(\sin(\varphi) * \cos\left(\frac{\alpha}{2}\right) - \sin\left(\frac{\alpha}{2}\right)\right) * \cos(\varphi)$$

$$Fe = \frac{Fn}{\cos(\varphi)} * \sin\left(\varphi - \frac{\alpha}{2}\right)$$

For a locking condition: Fe=0
Therefore:

$$\varphi - \frac{\alpha}{2} = 0$$

$\alpha = 2\varphi$ $\alpha = 2*\arctan(\mu)$

The angle for locking can be defined in terms of the coefficient of friction as $\alpha \leq 2*\arctan(\mu)$ $\alpha = 2*\arctan(0.06)$ Therefore $\alpha = 6.87°$ This locking taper force (Fe) was calculated using a conservative coefficient of friction for lubricated metal on metal of 0.06.

In another preferred embodiment, the locking taper force (Fe), dimensions of the tapered hole, and dimensions of the tapered head are calculated by taking into account "galling", which is another contributing locking mechanism between the mating sheets. Galling is a form of wear between sliding surfaces. For the fastener and assembly shown in FIGS. 1-5, the sliding surface is the interface between the tapered head 11 of the fastener 10 and the punched hole in the harder panel 24. In the presence of a high force compressing the surfaces together, galling occurs as material from both surfaces is pulled with the contacting surface. Galling is caused by a combination of friction and adhesion between the surfaces, followed by a tearing of the crystalline structure of the materials involved. The galling surfaces deposit material on the mating surface, effectively creating a friction or cold weld. Common materials that are prone to galling are titanium, stainless steel, and aluminum.

Figure 5A:
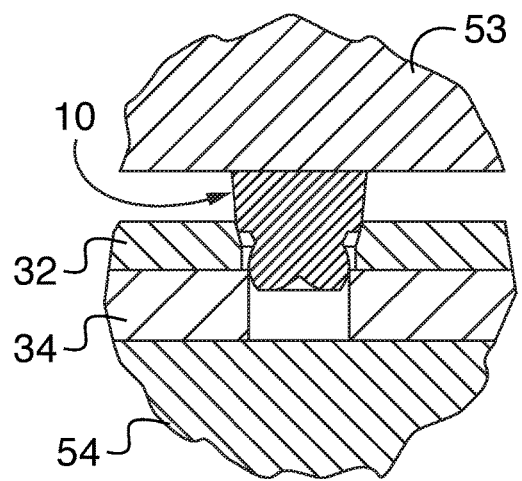
Figure 5B:
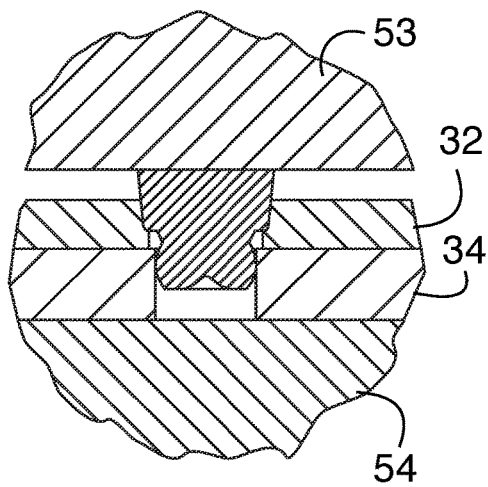
Figure 5C:
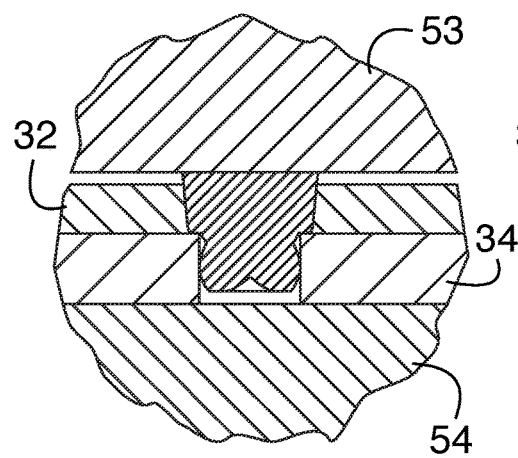
Figure 5D:
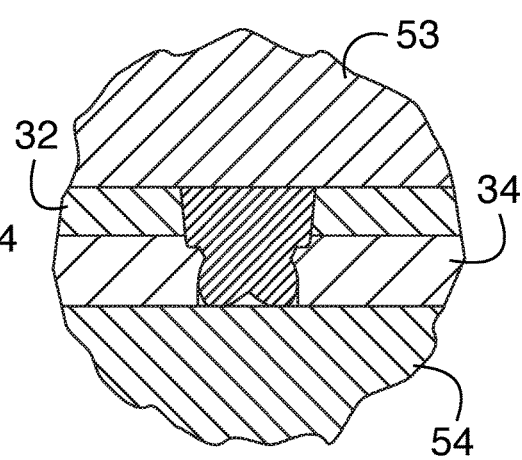

An assembly of two mating panels and a method of assembling the panels in accordance with a preferred embodiment of the invention are illustrated in FIGS. 5A-D. Referring to FIG. 5A, the fastener 10 is initially positioned in the hole in the top panel 32 in the orientation shown therein with the tapered surfaces properly aligned. Next, as seen in FIG. 2, a press tool 53 forces the fastener 10 downwardly into the top panel 32 from the tapered side of the hole while the bottom panel 34 is supported by an anvil 54. Then, as seen in FIGS. 5C and 5D, when the fastener 10 is pressed by the tool 53 against the anvil 54 with sufficient force, material from both panels flow slightly to form a uniform boundary between the two panels, which creates a very tight fit at high pressure between the fastener 10 and panels 32, 34. In this configuration, the fastener 10 can only be removed in the reverse direction of its installation. Furthermore, the tapered fastener head 11 is locked in the top panel 32 by the above-described locking taper force or galling or both.

FIG. 5A shows a profile of a punched hole, which has a first portion with straight walls, and a second portion which is conical and faces upward. As installation of the fastener progresses, FIGS. 5B and 5C show how the interface between the fastener and the hard top panel become unified in a common geometry. Pressure has made the top panel flow slightly to the fully conical shape, perfectly mated to the fastener 10. The tapered head locking fastener exhibits high forces between the mating tapered surface, as well as high friction during installation. In one exemplary embodiment of the invention, when a stainless steel fastener is pressed into a hard stainless steel top panel, galling occurs and aids in the retention of the fastener. The same can be said of any other combination of metals prone to galling. FIG. 5D shows the fully-installed fastener clinched into the softer bottom panel 54 resulting in the attachment of the two panels.

The foregoing is to be considered illustrative only of the principles and possible embodiments of the invention. Further, since numerous modifications and changes will readily occur to those skilled in the art, it is not desired to limit the invention to the exact construction and operation shown and described. Accordingly, suitable modifications and equivalents may be resorted to, all falling within the scope of the invention which shall be determined only by the following claims and their legal equivalents.

The invention claimed is:

1. A clinch fastener, comprising from top to bottom:
    a frustoconical head adapted to frictionally lock into a receiving hole, said head having a bottom surface substantially perpendicular to a central vertical axis of the fastener adapted to displace material to which the fastener is thereby affixed;
    an undercut located immediately below said head bottom surface and adapted to receive said material displaced by said head bottom surface; and
    a shank at the bottom of the fastener located immediately below the undercut.

2. The fastener of claim 1 wherein the head has a planar top surface substantially parallel to the bottom surface.

3. The fastener of claim 2 wherein the heads lateral cross section is circular and symmetrical about the axis.

4. The fastener of claim 1 wherein the distal end of the shank is tapered.

5. The fastener of claim 4 wherein the shank is barrel shaped.

6. An assembly, comprising:
    a first top panel having a first compound circular hole preformed prior to assembly with two concentric sections, a tapered upper section downwardly convergent to a junction with a contiguous cylindrical lower section of uniform diameter;
    a second panel positioned face-to-face with said first panel and having a second circular hole in alignment with the lower section of the first hole;
    a clinch fastener with a frustoconical head having an uninterrupted lateral surface and tapering which provides a self-locking effect to the first top panel thereby joining said first and second panels; and
    wherein a top surface of the fastener head is flush with a top surface of the first panel and the fastener head has a bottom surface substantially perpendicular to a central vertical axis of the fastener adapted to displace material from the bottom panel by direct contact therewith and further includes an undercut which receives the displaced material cold flow of metal from the bottom panel.

7. The assembly of claim 6 wherein both panels are composed of metal.

8. An assembly, comprising:
    a first top panel having a first compound circular hole with two concentric sections, a tapered upper section downwardly convergent to a junction with a contiguous lower section of uniform diameter;
    a second panel positioned face-to-face with said first panel having a second circular hole in alignment with the lower section of the first hole;
    a clinch fastener with a frustoconical head joining said first and second panels; and wherein the fastener head is adhered to the first panel by the effect of galling.

9. The assembly of claim 8 wherein the fastener and the top panel are composed of stainless steel.

10. The fastener as described in claim 1 or claim 6 wherein the angle of head taper is less than 10 degrees.

11. The fastener as described in claim 1 or claim 6 wherein the head taper is an angle of 6.87 degrees.

\* \* \* \* \*